No. 655,909. Patented Aug. 14, 1900.
O. H. NEBEL & O. B. HANSON.
COMBINED VISE AND APPARATUS FOR RAISING OR LOWERING WELL TUBES.
(Application filed Nov. 13, 1899.)
(No Model.)
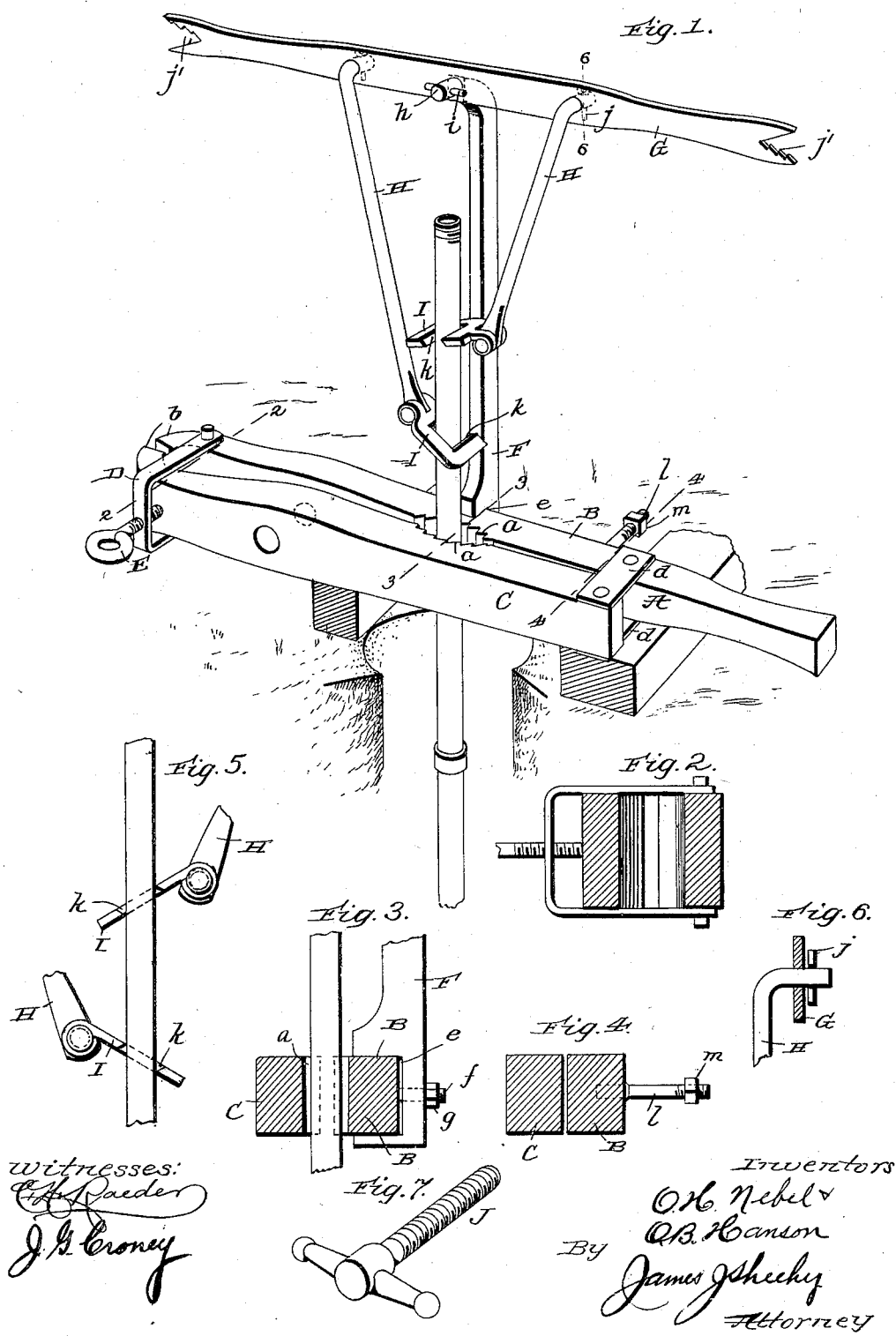

UNITED STATES PATENT OFFICE.

OSCAR H. NEBEL AND OSCAR B. HANSON, OF AUSTIN, MINNESOTA.

COMBINED VISE AND APPARATUS FOR RAISING OR LOWERING WELL-TUBES.

SPECIFICATION forming part of Letters Patent No. 655,909, dated August 14, 1900.

Application filed November 13, 1899. Serial No. 736,858. (No model.)

*To all whom it may concern:*

Be it known that we, OSCAR H. NEBEL and OSCAR B. HANSON, citizens of the United States, residing at Austin, in the county of Mower and State of Minnesota, have invented new and useful Improvements in a Combined Vise and Apparatus for Raising or Lowering Well-Tubes, of which the following is a specification.

Our invention relates to apparatus for raising and lowering well-tubes, and has for one of its objects to provide such an apparatus embodying means for expeditiously coupling and uncoupling the sections of well-tubes.

Another object is to provide an apparatus of the description stated embodying a vise which is adapted to be disconnected from the other parts and used on a bench after the well-known manner.

With the foregoing ends in view the invention will be fully understood from the following description and claims when taken in conjunction with the annexed drawings, in which—

Figure 1 is a perspective view illustrating our improved apparatus in its proper operative position. Figs. 2, 3, and 4 are enlarged transverse sections taken in the planes indicated by the broken lines 2 2, 3 3, and 4 4, respectively, of Fig. 1. Fig. 5 is a detail elevation illustrating the manner in which the dogs of the apparatus engage the well-tubing. Fig. 6 is an enlarged detail section taken on line 6 6 of Fig. 1. Fig. 7 is a view of the screw employed in conjunction with the vise when the same is attached to a bench.

Referring by letter to the said drawings, A is the vise of the apparatus. This vise forms a base and comprises two members B C, which have concave toothed portions $a$ in their inner faces at an intermediate point of their length and also have their free ends shaped, as shown, to form jaws $b$. The member B has two straps $d$, fixed to its opposite sides, between which the member C is pivotally mounted, as shown, so as to permit of it being moved toward or from said member B.

D is a bail pivotally connected to the vise member B, adjacent to the jaw $b$ thereof, and adapted to straddle the member C, and E is a screw mounted in the transverse portion of said bail and adapted to bear against the member C.

F is a standard which is recessed at $e$ to receive the vise member B and is detachably connected thereto through the medium of a bolt $f$ and nut $g$, as best shown in Fig. 3. This standard has a lateral arm $h$ at its upper end on which a lever G is fulcrumed and secured by a removable pin $i$, as shown. The said lever G is removable from the standard F and is provided at its ends with fish-mouths $j'$, one of the walls of each of which is toothed or serrated, as shown, whereby the lever is adapted to be used as a pipe-wrench, as will hereinafter be described.

H shows arms pivoted in the lever G and detachably connected thereto by removable pins $j$, and I shows pipe-engaging dogs pivotally connected to the free ends of the said arms. These dogs are recessed, as indicated by $k$, to enable them to receive a pipe, and the opposite walls of said recesses are beveled, as shown, whereby it will be seen that incident to the raising of tubing by one dog the other dog is free to move down on the tubing into position to take a fresh hold thereof.

When it is desired to use our improved apparatus to raise well-tubing, the bail D is swung from over the vise member C and the free end of said member C is swung away from the member B, after which the apparatus is moved across the mouth of the well until the uppermost section of well-tubing rests between the concave toothed portions $a$ of the vise members, when the bail D is returned to the position shown in Fig. 1, and the screw E is turned inwardly until it bears against the vise member C. The dogs I are now placed in engagement with the uppermost section of tubing, as shown in Fig. 1, and the lever G is rocked until the first coupling is raised to a position above the vise, when the screw E is turned inwardly, so as to clamp the second tubing-section between the vise members B C. The lever G is now disconnected from the standard F and is used as a wrench to disconnect the uppermost tubing-section from the second section. With this done the said lever G is replaced on the standard, the dogs I are placed in engagement with the aforesaid second section of tubing, the screw E is turned outwardly to relieve the pressure of the vise members against the tubing-section, and the lever G is rocked until the next coupling is raised to a position above the vise, when the operation described is repeated.

It will be appreciated from the foregoing that through the medium of our apparatus a sectional well-tube may be expeditiously raised from a well and taken apart. It will also be observed that the apparatus may be used to advantage in putting the sections of a well-tubing together and lowering the same into a well, this operation being carried out as follows: A section of tubing is secured in the vise and a second section is coupled thereto through the medium of the lever G, used as a wrench. The said lever is then replaced on the standard F and the dogs I are placed in engagement with the upper pipe-section, after which the screw E is turned outwardly to relieve the pressure of the vise members against the lower pipe-section. With this done the operator grasps the lever G with one hand and with his other hand disengages one dog from the section, meantime permitting the lever to rock and the tubing to move downwardly. This latter operation is repeated until the coupling between the first and second sections is lowered below the vise, when the general operation described is repeated.

The standard F is detachably connected to the vise member B, and hence it will be seen that when desired the vise may be separated from the other parts and attached to a bench through the medium of the bolt $l$ and nut $m$, with which the member B is equipped. When the vise is thus mounted, the bail D and its screw E are swung into an idle position and the ordinary screw J (shown in Fig. 7) placed in engagement with the vise members which are adapted to receive it.

Having thus described our invention, what we claim is—

1. In the apparatus described, the combination of the vise forming a base for the apparatus, and comprising two members connected together in a hinged manner and arranged so as to move horizontally toward and from each other; said members being provided on their inner faces at an intermediate point of their length with vertically-disposed teeth or serrations whereby they are enabled to hold a tube against both vertical and rotary movement, and means for clamping said members against a tube, a standard connected to and rising from one member of the vise, a lever fulcrumed at an intermediate point of its length on the standard, and tube-engaging dogs loosely connected with said lever at opposite sides of the fulcrum-point thereof, substantially as specified.

2. In the apparatus described the combination of a vise forming a base and comprising two members connected together in a hinged manner, and arranged to move horizontally toward and from each other; said members being provided on their inner faces at an intermediate point of their length with vertically-disposed teeth or serrations, and means for clamping said members against a tube, the standard connected to one member of the vise, a lever fulcrumed on the standard and detachable therefrom, and having a toothed fish-mouth at one end, arms or links loosely connected to the lever at opposite sides of the fulcrum-point thereof, and tube-engaging dogs loosely connected to said arms or links, all as and for the purpose set forth.

In testimony whereof we have hereunto set our hands in presence of two subscribing witnesses.

OSCAR H. NEBEL.
OSCAR B. HANSON.

Witnesses:
WM. NEBEL,
NICK MALMSTROM.